April 18, 1950     J. J. MORRONE     2,504,145

DRINK DISPENSER AND COUNTER

Filed July 30, 1946

INVENTOR
JOHN J. MORRONE
BY
Bair, Borden & Fox
ATTORNEYS

Patented Apr. 18, 1950

2,504,145

UNITED STATES PATENT OFFICE 2,504,145

DRINK DISPENSER AND COUNTER

John J. Morrone, Philadelphia, Pa.

Application July 30, 1946, Serial No. 687,180

4 Claims. (Cl. 222—38)

This invention relates to drink dispensers and counters.

There are many situations in barkeeping that permit the bartender to furnish an unchecked amount of liquor to favored friends and the like, and the proprietor is frequently the loser because of financial returns disproportionate to the actual amount of liquor dispensed. There have been attempts in the past to meter the volume poured at each drink, by means more positive than the particular size of the jigger used, but so far as known these have all been susceptible to criticism.

It is among the objects of this invention: to meter drinks accurately and easily so that only the predetermined drink can be dispensed at one time; to combine a meter for a given volume of liquor at a given dispensation with a counting device to permanently indicate the number of the metered charges dispensed from the given bottle; to provide a single agency by which a metered amount of liquor can be dispensed in synchronism with the actuation of a counter recording the passage of the metered drink; and to combine a counter and metering system for a liquor bottle such that the counter actuation is predeterminedly effective before the dispensing of the metered drink.

Many other objects and advantages of the invention will become more apparent as the description proceeds.

Figure 1:
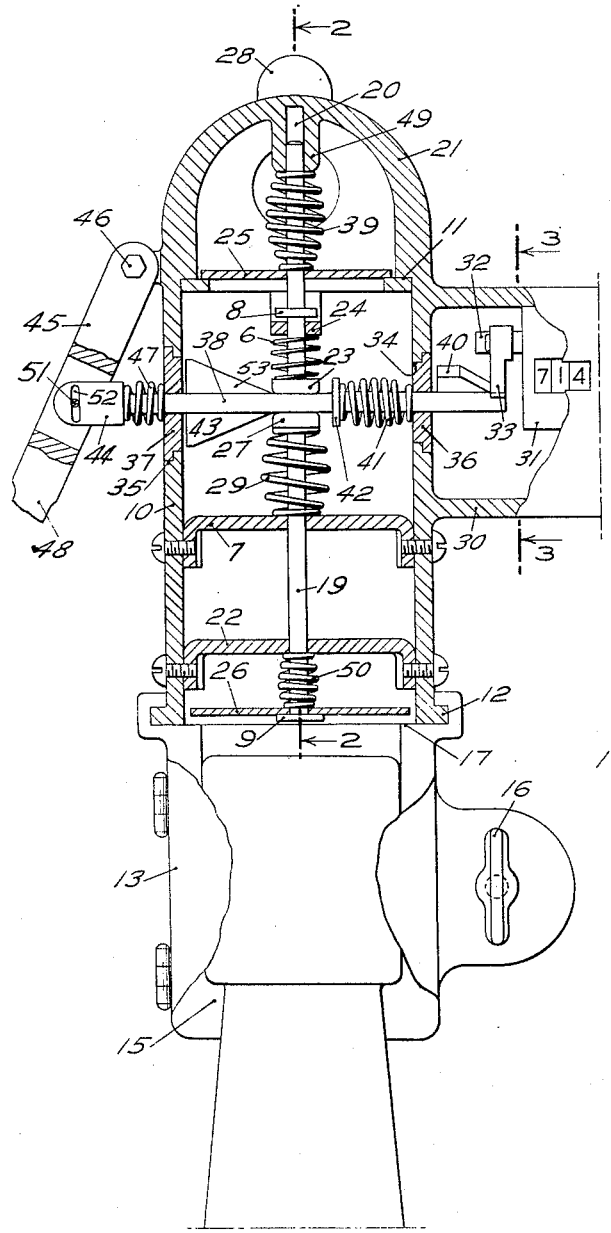
Fig. 1 represents a vertical section, partially in full lines, of the combined meter and counter of the invention locked to the fragmentary upper end of a bottle.
Figure 2:
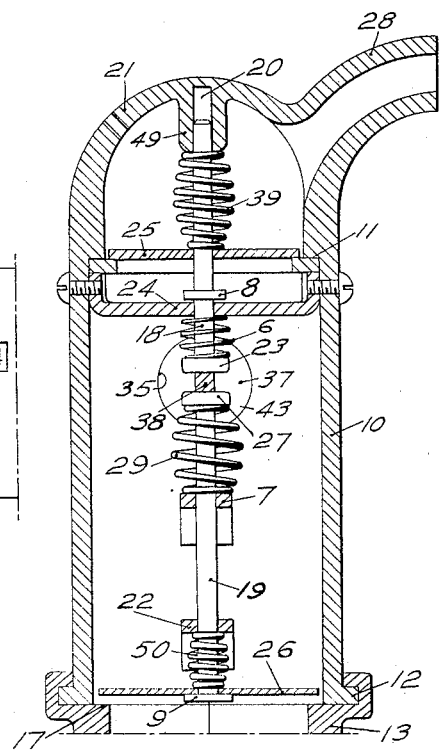
Fig. 2 represents a section on the line 2—2 thereof.
Figure 3:
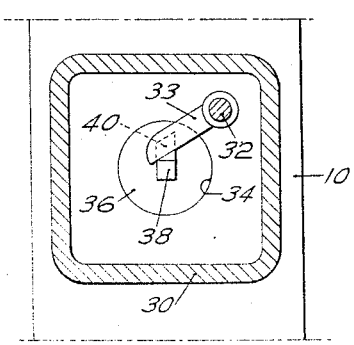
Fig. 3 represents a fragmentary section taken on the line 3—3 of Fig. 1.

The invention according to a preferred embodiment comprises a generally cylindrical housing 10, having internally, toward the top, an upwardly presenting valve seat 11, which may be an insert, and at the bottom being flanged as at 12 to seat in the neck-embracing pivoted element 13 having the lower locking flange 15. The element 13 includes the key controlled lock element 16 of any conventional type, by which the associated cylinder 10 and base 13 can be locked immovably to any given bottle, and can be quickly removed and replaced upon another when the bottle becomes empty. Presumably, and normally, the detached assembly will be anchored to a full bottle, to start with.

The upper end of the locking base element 13 has a flange valve seat 17 upwardly presenting in spaced relation to the valve seat 11. A compound valve element is provided comprising the axially aligned vertical shafts 18 and 19. Shaft 18 is slidably guided vertically at its upper end in the shaft guide aperture 20 in the dome 21 of the cylinder, and toward its lower end guided by the transverse guide strut or brace element 24, rigidly carried by the cylinder 10 on its inner surface close to the upper end 21 of the cylinder, with shaft 18 concentric with cylinder 10. The shaft 18 at its lower end is enlarged as at 23, to form a cam-wiping shaft-actuating member, held against the cam shaft by spring 6. Shaft 18 passes slidably through the valve disc 25, which, when seated on valve seat 11 closes the dome portion 21 of the cylinder from the space below the valve disc 25, and its valve seat 11. Between valve disc 25, and cross strut 24 the shaft carries an axially rigid flange 8 which, of course, moves with the shaft 18. Toward the lower end shaft 19 passes slidably through the valve disc 26, which is normally open relative to seat 17, and terminates in a lower flange 9. An enlarged head or flange 27 forms a bearing on the shaft 19 between which and an additional transverse strut 7, a rather stiff oval-profiled compression spring 29 is held under compression. This normally forces the valve actuating shaft 19 vertically upwardly. By means of a spring 39 and shaft guide housing 49 forces the disc 25 against its seat 11. A spring 50 engages between lower valve disc 26 and the transverse strut 22. A spout 28 for pouring is mounted in the dome 21. It will be understood that the housing and other parts so far described or to be described may be formed of any metals, plastics, or other materials or mixtures thereof desired, and may be formed or made in a plurality of subsequently assembled heat-sealed or otherwise anchored components. This facilitates the formation of valve seats, shafts, and the like.

The cylinder 10 has a preferably integral lateral tubular extension 30 containing a windowed counter device 31 of any desired formation, visible and readable from the outside of the device, and including an actuating shaft 32 carrying the crank arm 33 and arranged to advance the counter one digit at a time, with a restricted angular movement of the crank 33 in one direction and return. The cylinder 10, in line with the enlargement 30 of the vertical shaft, has diametrically spaced apertures respectively 34 leading to the extension 30, and 35 oppositely directed toward the handle, to be described, in which apertures the leakproof bushings, respectively 36 and 37, are tightly mounted, carrying the laterally slidable actuating cam shaft 38 passing and between space between juxtaposed terminal members 23 and 27 of the respective vertical shafts 18 and 19.

The cam shaft 38 may be made in any desired number of initial components ultimately assembled as shown, and carries a cam 40 on the extension end of the shaft 38 in such position on the shaft and relative to the lever 33 as to engage and actuate same through the required angularity at the outset of or as part of the first axial movement of the shaft 38. Cam 40 is normally retracted and maintained out of actuating engagement with crank 33 by means of the compression spring 41 engaging between a pin or flange 42 on the transverse shaft 38, and the stationary bushing element 36. A secondary or metering cam 43 is provided on the lower portion of the shaft 38 adjacent to and in position to engage the terminal member 27 on vertical shaft 19, and arranged upon axial movement of cam shaft 38 to force the shaft 19 downwardly, against the resistance of the spring 29. A complemental vertically disposed secondary cam 53 is carried by transverse shaft 38 and is arranged upon axial mount of the latter to the right, to engage and elevate terminal member 23 of the upper shaft 18. In due course, flange 8 engages under and raises valve disc 25 from its seat 11. Axial movement of the shaft 38 is ineffective to actuate vertical shaft 18 to change the normal valve disposition indicated in Fig. 1, until after the proposed drink has been recorded on the counter 31 by actuation thereof by cam 40, in the preferred embodiment of the invention.

The outer end of the shaft 38 is preferably provided with a vertical slotted enlargement 44, and the latter is disposed in a vertical slot or recess in an actuating lever 45, to which it is secured by a pin 51 disposed in vertical slot 52 in shaft end 44. Handle lever 45 is pivoted on the cylinder 10 at 46, normally spring pressed outwardly either by internal spring 41 or by an external compression spring 47. The lever 45 at the lower end has an actuating handle element 48. If desired the shaft 38 can be arranged for direct finger operation by engagement of the outer end 44 thereof.

In operation the bartender tilts the bottle to an inverted position, possibly juxtaposed to the jigger or other measuring receptacle for the liquor in the bottle, but probably directly into the receptacle in which it is to be mixed, as this invention obviates use of a measuring jigger except for unusual circumstances. Owing to the normal valve situation at the time, liquor in the bottle will flow downwardly by gravity past the valve seat 17 and the opened valve 26 to fill the space between the two valves with liquor in a predeterminedly known metered amount. At this juncture the barkeeper or bartender will press the handle 48 toward the bottle with a natural and easy motion which will move the cam shaft laterally inwardly and synchronously will ring up or record the drink on the counter and will move shafts 18 and 19 vertically respectively upwardly and downwardly. This movement will first snap shut valve disc 26 on seat 17, and thereafter will cause flange 8 to engage and unseat valve disc 25, which will permit the metered drink to pass out through the spout 28. When the metered amount has flowed out, the flow will stop, and to secure additional flow, the bartender will first have to release the handle 48, thus releasing the cams which respectively condition the counter crank arm for the next cam stroke of an additional count, and reverses the valve shaft position, which permits the spring 39 to force valve disc 25 against seat 11, before the flange 9 engages and unseats disc 26 from seat 17, which admits another flow into the metering chamber.

The advantages and simplicity of the invention will be evident.

Having thus described my invention, I claim:

1. A drink dispenser for bottles comprising a housing mountable on a bottle, a pouring outlet toward the end of the housing spaced from the bottle, a valve seat in the housing adjacent to the pouring opening, a second valve seat in the housing in predeterminedly spaced relation to the first mentioned seat to establish a predetermined volume in the housing for metering a drink from said bottle, a first shaft mounted for movement axially of the housing, a first spring urging said shaft in one axial direction, a valve disc slidable on the shaft, means normally urging the valve disc to engage the first mentioned seat, a second shaft, a second spring urging said second shaft in one axial direction opposite to the urge of the first shape, a second valve disc slidable on said second shaft in position to seat on said second mentioned valve seat when the shaft is properly moved against the urge of said second spring but normally out of contact therewith to permit liquid from the bottle to enter into said housing, and means for moving the first and second shafts axially against the respective urges of the first and second springs to successively close the last mentioned disc against the second valve to shut off liquid from the bottle and to remove the first mentioned disc from the first mentioned seat to permit entrapped liquid in said housing to pass through the pouring opening.

2. A drink dispenser for bottles comprising a housing mountable on a bottle, a pouring outlet toward the end of the housing spaced from the bottle, a valve seat in the housing adjacent to the pouring opening, a second valve seat in the housing in predeterminedly spaced relation to the first mentioned seat to establish a predetermined volume in the housing for metering a drink from said bottle, a first shaft mounted for movement axially of the housing, a first spring urging said shaft in one axial direction, a valve disc slidable on the shaft, means normally urging the valve disc to engage the first mentioned seat, a second shaft, a second spring urging said second shaft in one axial direction opposite to the urge of the first shaft, a second valve disc slidable on said second shaft in position to seat on said second mentioned valve seat when the shaft is properly moved against the urge of said second spring but normally out of contact therewith to permit liquid from the bottle to enter into said housing, means for moving the first and second shafts axially against the respective urges of the first and second springs to successively close the last mentioned disc against the second valve seat to shut off liquid from the bottle and to remove the first mentioned disc from the first mentioned seat to permit entrapped liquid in said housing to pass through the pouring opening, and means operative in synchronism with the shaft movement for recording a unit representative of a dispensed drink.

3. A drink dispenser for bottles comprising a housing mountable on a bottle, a pouring outlet toward the end of the housing spaced from the bottle, a valve seat in the housing adjacent to the pouring opening, a second valve seat being formed in the housing in predeterminedly spaced relation to the first mentioned seat to establish a predetermined volume in the housing for metering a drink from said bottle, a first shaft mounted for movement axially of the housing, a first spring urging said shaft in one axial direction, a valve disc slidable on the shaft, means normally urging the valve disc to engage the first mentioned seat, a second shaft, a second spring urging said second shaft in one axial direction opposite to the urge of the first shaft, a second valve disc slidable on said second shaft in position to seat on said second mentioned valve seat when the shaft is properly moved against the urge of said second spring but normally out of contact therewith to permit liquid from the bottle to enter into said housing, means for moving the first and second shafts axially against the respective urges of the first and second springs to successively close the last mentioned disc against the second valve seat to shut off liquid from the bottle and to remove the first mentioned disc from the first mentioned seat to permit entrapped liquid in said housing to pass through the pouring opening, said shafts having a cam receiving separating space between them, a cam shaft slidably mounted transversely of the housing and having a cam for engagement with each of said shafts to actuate the said shafts as a function of cam shaft movement, and means for sliding said cam shaft.

4. A drink dispenser for bottles comprising a housing mountable on a bottle, a pouring outlet toward the end of the housing spaced from the bottle, a valve seat in the housing adjacent to the pouring opening, a second valve seat being formed in the housing in predeterminedly spaced relation to the first mentioned seat to establish a predetermined volume in the housing for metering a drink from said bottle, a first shaft mounted for movement axially of the housing, a first spring urging said shaft in one axial direction, a valve disc slidable on the shaft, means normally urging the valve disc to engage the first mentioned seat, a second shaft, a second spring urging said second shaft in one axial direction opposite to the urge of the first shaft, a second valve disc slidable on said second shaft in position to seat on said second mentioned valve seat when the shaft is properly moved against the urge of said second spring but normally out of contact therewith to permit liquid from the bottle to enter into said housing, means for moving the first and second shafts axially against the respective urges of the first and second springs to successively close the last mentioned disc against the second valve seat to shut off liquid from the bottle and to remove the first mentioned disc from the first mentioned seat to permit entrapped liquid in said housing to pass through the pouring opening, said shafts having a cam receiving separating space between them, a cam shaft slidably mounted transversely of the housing and having a cam for engagement with each of said shafts to actuate the said shaft as a function of cam shaft movement, means for sliding said cam shaft, a counting device, a counting cam on said cam shaft, and means on the counting device responsive to the advance of said counting cam in the sliding of the cam shaft to change the record of the counting device by a suitable unit.

JOHN J. MORRONE.

REFERENCES CITED

The following references are of record in the file of this patent:

UNITED STATES PATENTS

| Number | Name | Date |
|---|---|---|
| 1,256,293 | Cremona | Feb. 12, 1918 |
| 1,594,367 | Heron | Aug. 3, 1926 |
| 2,106,649 | Officer | Jan. 25, 1938 |
| 2,199,312 | Henry | Apr. 30, 1940 |

FOREIGN PATENTS

| Number | Country | Date |
|---|---|---|
| 27,403 | Denmark | Mar. 23, 1921 |
| 31,128 | Switzerland | July 28, 1904 |